United States Patent
Schatt et al.

[11] Patent Number: 5,973,294
[45] Date of Patent: Oct. 26, 1999

[54] HEATED WINDSHIELD SCRAPER DEVICE

[76] Inventors: Michael Schatt; Keith Edleblute, both of 245 Redwood La., Carlisle, Pa. 17013

[21] Appl. No.: 09/135,329

[22] Filed: Aug. 17, 1998

[51] Int. Cl.[6] .................................................... H05B 1/00
[52] U.S. Cl. ............................................ 219/228; 30/140
[58] Field of Search ............................ 219/228, 227, 219/229, 201, 203, 497; 15/236.01, 236.02, 111, 401, 322; 294/57; 132/265; 30/383, 140; 37/230

[56] References Cited

U.S. PATENT DOCUMENTS

| | | | |
|---|---|---|---|
| 3,711,679 | 1/1973 | Moschkau et al. | 219/227 |
| 4,598,192 | 7/1986 | Garrett | 219/201 |
| 4,654,970 | 4/1987 | Nagashima | 30/383 |
| 4,994,650 | 2/1991 | Koontz | 219/497 |
| 5,189,756 | 3/1993 | Sprunger | 15/322 |
| 5,287,593 | 2/1994 | Sprunger | 15/401 |
| 5,357,646 | 10/1994 | Kim | 15/111 |
| 5,479,951 | 1/1996 | Denebeim | 132/265 |
| 5,543,601 | 8/1996 | Bartrug et al. | 219/203 |
| 5,795,000 | 8/1998 | Aldorasi | 294/57 |

*Primary Examiner*—Teresa Walberg
*Assistant Examiner*—Quang Van
*Attorney, Agent, or Firm*—Henderson & Sturm

[57] ABSTRACT

A heated windshield scraper device 10 including a scraper blade member 20 mounted on a housing member 21 that is telescopically received in a handle member 30 that contains an adjustable heating unit 13 that provides heat both to the scraper blade member 20 and the handle member 30.

5 Claims, 2 Drawing Sheets

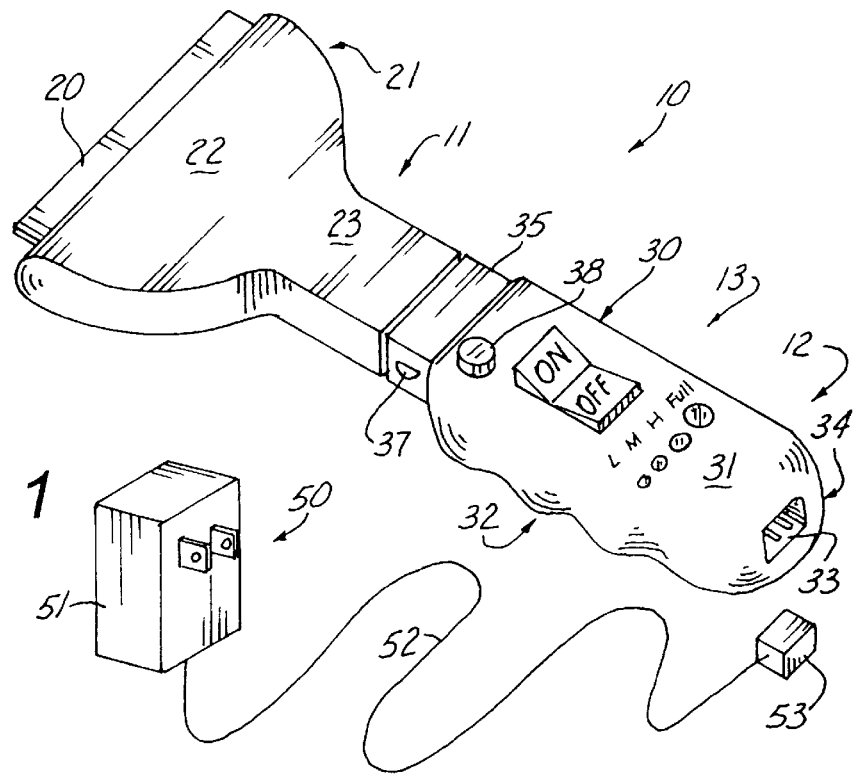
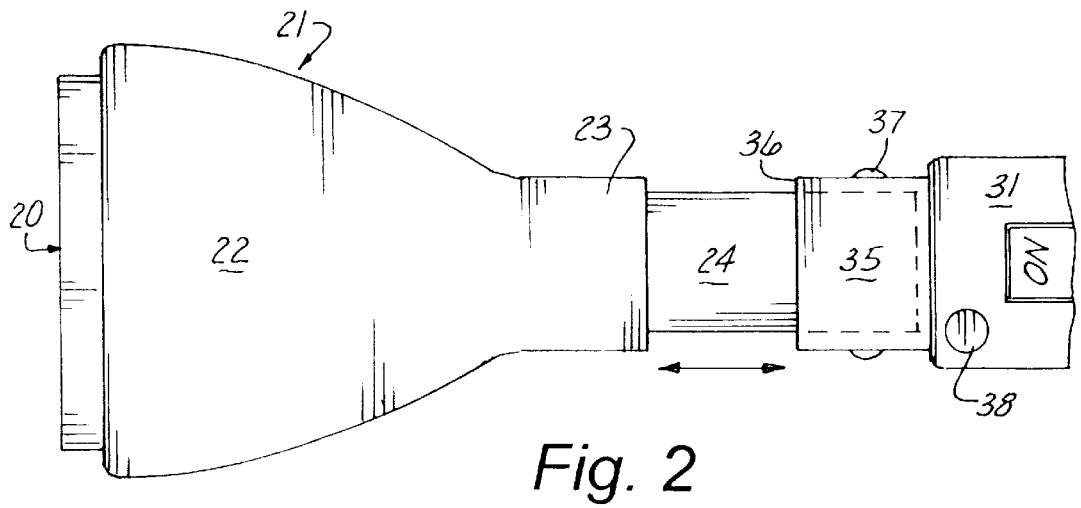

HEATED WINDSHIELD SCRAPER DEVICE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of heated windshield scrapers in general, and in particular to an adjustable extendable heated windshield scraper having a heated handle.

2. Description of Related Art

As can be seen by reference to the following U.S. Pat. Nos. 3,711,679; 5,189,756; 5,287,593; and 5,357,646, the prior art is replete with myriad and diverse heated windshield scrapers.

While all of the aforementioned prior art constructions are more than adequate for the basic purpose and function they are deficient in a number of noticeable instances, particularly their failure to provide a simple, practical and efficient heated windshield scraper device that has both a variable heat control, as well as providing a heated handle to keep the user's hands warm while using the device.

As most users of the prior art devices are all too well aware, insufficient heat delivered to the scraping blade will not effectively remove ice and too much heat delivered to the blade runs the risk of cracking the vehicle windshield. In addition, since the process of removing ice from a windshield is a normally time consuming task. It is unfortunate that the prior art devices also do not provide a means for keeping the user's hands warm during the scraping process.

As a consequence of the foregoing situation, there has existed a longstanding need for a new type of heated windshield scraping device that not only has a variable heat control, but which also incorporates a hand warming element in the handle, and the provision of such a construction is a stated objective of the present invention.

BRIEF SUMMARY OF THE INVENTION

Briefly stated, the heated windshield scraping device that forms the basis of the present invention comprises in general, a blade unit, a handle unit, and an adjustable heating unit. The blade unit is extendable and retractable relative to the handle unit and the adjustable heating unit provides heat to both the blade unit and the handle unit.

As will be explained in greater detail further on in the specification, the blade unit includes a scraper blade member mounted on the outboard end of a housing member wherein the inboard end of the housing member is provided with a rearwardly extending stem element.

In addition, the handle unit includes a handle member dimensioned to slidably receive and releasably engage the stem element of the housing member.

Furthermore, the adjustable heating unit includes a plurality of heating wire elements powered by a power source and connected to the scraper blade member and at least one additional heating wire element disposed within the handle member. All of the heating wire elements are operatively connected to a series of control switches for delivering varying levels of power simultaneously to all of the heating wire elements heating coils into the handle of the scraper and the provision of such a construction is the stated objective of the present invention.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the heated windshield wiper scraper device that forms the basis of the present invention;

FIG. 2 is a top plan view of the scraper device;

DETAILED DESCRIPTION OF THE INVENTION

Figures 3, 4:
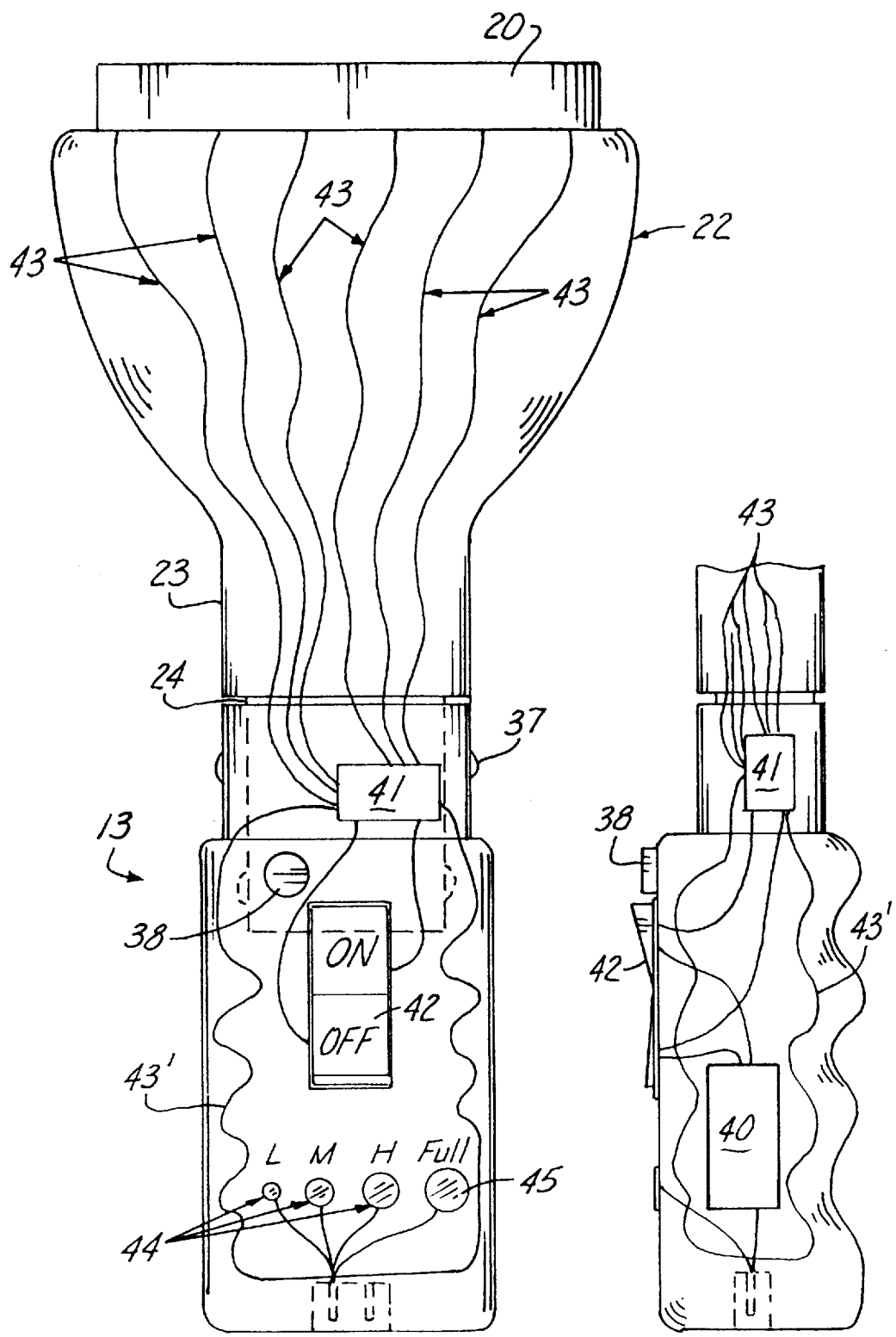
FIG. 3 is a schematic view of the wiring components within the device.
FIG. 4 is an isolated schematic view of the electrical components disposed within the handle portion of the device.

As can be seen by reference to the drawings, and in particularly to FIG. 1, the heated windshield scraper device that forms the basis of the present invention is designated generally by the reference number 10. The device 10 comprises in general, a scraper unit 11, a handle unit 12, and an adjustable heating unit 13. These units will now be described in seriatim fashion.

As can best be seen by reference to FIGS. 1 and 2, the scraper unit 11 comprises a scraper blade member 20 formed on the outboard end of an upper housing member 21 having an enlarged upper head portion 22 and a reduced diameter lower neck portion 23 having a further reduced diameter stem element 24 extending rearwardly therefrom.

Still referring to FIGS. 1 and 2, it can be seen that the handle unit 12 comprises in general an enlarged handle member 30 having an upper control surface 31 and a lower contoured hand grip surface 32, an electrical receptacle opening 33 formed in the proximal end 34 and a reduced diameter collar element 35 formed in the distal end 36. The collar element 35 is dimensioned to slidably receive the stem element 24 of the upper housing member 21 of the blade unit 11. The reduced diameter collar element 35 is further provided with a detent mechanism 37 is dimensioned to releasably engage the stem element 24 in a well recognized fashion.

Furthermore, the upper control surface 31 of the handle member 30 is provided with a conventional push button release mechanism 38 that will override the detent mechanism 37 such that the scraper unit 11 can be extended and retracted relative to the handle unit 12 in a well recognized fashion.

Turning now to FIGS. 3 and 4, it can be seen that the heating unit 13 comprises in general a rechargeable power source 40 connected to a transformer element 41 by an on-off switch 42. A plurality of heating wire elements 43 extend from the transformer element 41 through the collar element 35 of the handle member 30 and the stem element 24 of the upper housing member 21 into direct contract with the scraper blade member 20.

In addition, at least one additional heating wire element 43' extends from the transformer element 41 and is disposed entirely within the handle member 30 to provide warmth to the handle member 30 during use.

Furthermore, as shown in FIGS. 1 and 3, the upper control surface 31 of the handle member 30 is provided with a plurality of conventional heat intensity control buttons 44 labeled low, medium, and high that are used to control the amount of current and therefore the amount of heat that is delivered to both the scraper blade member 20 and the handle member 30 in a well recognized fashion.

In addition, a power level indicator light 45 is also provided on the upper control surface 31 of the handle member 30 to alert the user as to the amount of power remaining in the rechargeable power source 40.

As can also be seen by reference to FIG. 1, this invention also contemplates the provision of a recharging member designated generally as 50 and including a plug element 51 connected by an electrical cord 52 to a receptacle element 53 dimensioned to be received in the electrical opening 33 formed in the proximal end 34 of the handle member 30.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A heated windshield scraper device consisting of:

a housing member, a blade unit including a scraper blade member mounted on the outboard end of said housing member;

a handle unit operatively associated with the blade unit and including a handle member having an upper control surface and a lower hand grip surface; wherein the blade unit is extendable and retractable relative to the handle unit;

a heating unit including a power source operatively connected to a plurality of heating wire elements that are within said blade unit and in direct contact with the scraper blade member and at least one additional heating wire element entirely disposed within said handle member for providing warmth to said handle member; and means for adjusting the level of heat that is delivered from said power source to both the plurality of heating wire elements that are in direct contact with the scraper blade member and the at least one additional heating wire element that is disposed entirely within said handle member.

2. The device as in claim 1 wherein said handle member is further provided with a releasable detent mechanism for captively engaging a portion of the housing member.

3. The device as in claim 2 wherein said handle member is further provided with a push button mechanism for overriding said releasable detent mechanism.

4. The device as in claim 3 wherein said power source is rechargeable.

5. The device as in claim 4 wherein said handle member is further provided with indicator means for representing the power level remaining in said rechargeable power source.

\* \* \* \* \*